United States Patent

Engstrom et al.

[11] Patent Number: 5,909,436
[45] Date of Patent: *Jun. 1, 1999

[54] RANDOM ACCESS ORTHOGONAL FREQUENCY DIVISION MULTIPLEX SYSTEM AND METHOD

[75] Inventors: Bo Engstrom; Roger Larsson; Mattias Wahlqvist; Christer Ostberg, all of Lulea, Sweden

[73] Assignee: Telia AB, Farsta, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/704,809

[22] Filed: Aug. 28, 1996

[30] Foreign Application Priority Data

Aug. 28, 1995 [SE] Sweden .................................. 9502963

[51] Int. Cl.$^6$ .................................................. H04J 13/00
[52] U.S. Cl. .......................... 370/343; 370/206; 370/208; 370/335; 455/63; 455/422
[58] Field of Search ....................................... 370/344, 343, 370/335, 206, 207, 208, 209, 210, 342, 336, 318, 337; 375/202, 261, 362; 455/63, 422, 517

[56] References Cited

U.S. PATENT DOCUMENTS

| 4,688,210 | 8/1987 | Eizenhöfer et al. | 370/335 |
|---|---|---|---|
| 5,416,801 | 5/1995 | Chouly et al. | 370/207 |
| 5,548,582 | 8/1996 | Brajal et al. | 370/206 |
| 5,602,835 | 2/1997 | Seki et al. | 370/206 |

*Primary Examiner*—Douglas W. Olms
*Assistant Examiner*—Shick Hom
*Attorney, Agent, or Firm*—Oblon, Spivak, McClelland, Maier & Neustadt, P.C.

[57] ABSTRACT

A random access protocol system and method for communicating between a mobile station and a base station in a multi-access digital radio communication system, including the steps of cyclically repeating a random access sequence and transmitting each cyclically repeated random access sequence in an orthogonal frequency division multiplex format from the mobile station as an uplink transmission.

30 Claims, 8 Drawing Sheets

RANDOM ACCESS ORTHOGONAL FREQUENCY DIVISION MULTIPLEX SYSTEM AND METHOD

BACKGROUND OF THE INVENTION

1. Field of the Invention

The present invention relates to the use of OFDM (orthogonal frequency division multiplex) in radio telephony systems, and more particularly to a random access protocol applicable to when a mobile station (MS) in a radio telephony system initiates a call, or when a call is handed over from one base station (BS) to another (handover).

2. Discussion of the Background

A random access (RA) protocol defines a method by which a MS initiates contact with a BS, when the BS is not synchronized with the MS. This situation can arise when the MS initiates a call (i.e., when a call is activated) or when a call already in progress is transferred from one BS to another BS.

In an OFDM system, data (information) is modulated onto a broadband signal comprising a large number of individual (discrete) frequency carriers (subcarriers), the aggregate of which form a frequency division multiplex scheme. Bandwidths of the individual sub-carriers, are small and arranged so that the maximum power spectrum of a first sub-carriers represented by sinc(x) (i.e., sinc(x)=sin(x)/x), corresponds with the first minimum in a second sinc(x) function which corresponds to a power spectrum of an adjacent sub-carrier. In each case "x" corresponds to a symbol length of a data symbol modulating the respective carrier.

In other words, the carrier separation equals 1/(symbol length), for rectangular symbols. It is for this reason that adjacent carriers are described as "orthogonal". OFDM systems normally use a FFT (fast Fourier transform) process to demodulate the data signal from the transmitted (carrier) signal. Convolutional forward error coding and FFT techniques may be employed at the modulator (transmitter) stage in order to improve system performance. In the receiver, complementary FFT processing is combined with Viterbi decoding, at the demodulator stage in order to properly decode the information processes by the corresponding techniques at the modulation stage. This ensures that the overall bit error rate is very low. This particular variant of OFDM is known as CD OFDM (Code Division Orthogonal Frequency Division Multiplex). For convenience, in this specification the term OFDM is used to refer to both FD OFDM (frequency divided OFDM) and CD OFDM, unless specific reference is made to either FD OFDM, or CD OFDM.

Using OFDM in the uplink of a multi-access system requires that all mobile stations in the system meet the requirements for orthogonality in the time and frequency domain between sub-carriers. The use of FD OFDM thus requires a random access technique that does not disturb the orthogonality between sub-carriers. Because time synchronization between a BS and an MS is essential to establish and maintain connectivity, it is vital that the delay difference between a MS and a BS be estimated during a random access protocol so that orthogonality between sub-carriers be preserved.

In a random access protocol, a mobile station transmits a known signal sequence to a base station. The base station can lock onto the known sequence, detect it and estimate the time delay.

Multi-access (i.e., multiple users share common radio frequency resources) radio telephony systems are of course well known, e.g. the GSM (Global System for Mobile Communications European Cellular Standard) system, in which a plurality of mobile stations are served via a plurality of base stations connected to a communications infrastructure for controlling individual communications and routing such communications via a land based network, e.g. a PSTN (Public Standard Telephone Network). All such systems require a random access protocol, or a procedure to permit mobile users to enter the network. The use of conventional OFDM for such systems is also known. However, as recognized by the inventors, the requirements of OFDM with regard to sub-carrier orthogonality imposes special problems.

PCT patent application WO 95/07581 describes a method of synchronizing an OFDM QAM (quadrature amplitude modulation), or QPSK (quadrature Phase Shift Keying), receiver when it is first switched on. The transmitted signal power is set at zero for part of the synchronization symbol. During the remaining part of the symbol, the symbol is modulated with a sequence that has optimum auto-correlation properties. The invention is alleged to require only a single symbol for synchronization.

U.S. Pat. No. 5,228,025 discloses a method of synchronization for use in an OFDM system. Certain sub-carriers are omitted, or reduced in power, in the sub-carrier raster (selection). The method is applied to the broadcasting of digital data in multiple channels, notably radio (program) broadcasting, and the synchronization pattern to establish communications is repeated.

PCT patent application WO 92/16063 discloses an OFDM system for broadcasting and receiving digital data within time division multiplexed channels. Each OFDM frame includes frequency reference symbols for synchronization of a receiver with a transmitter.

Synchronization techniques used in OFDM and TDMA systems are also disclosed in U.S. Pat. No. 5,191,576; PCT patent application WO 93/11616; European patent application 0,549,445 A1; and European patent application 0,608,024 A1.

However, none of the cited prior art documents discloses the use, in a digital radio telephony system, of a random access protocol in which a random access sequence can be cyclically repeated, to facilitate connection of a mobile station to a base station upon call initiation or upon call handover

SUMMARY OF THE INVENTION

According to a first aspect of the present invention, there is provided a random access protocol for use in a multi-access digital radio communications system having a plurality of mobile stations and a plurality of base stations and using OFDM for an uplink between a mobile station and base station in which a mobile station transmits a random access sequence, characterized in that the mobile station cyclically repeats a random access sequence. Preferably the uplink employs FD OFDM.

The mobile station listens for a "PICH" (pilot channel) transmitted by the base station, and after detection of the PICH, the mobile station synchronizes to OFDM symbols transmitted by the base station. The mobile station listens to a BCH (broadcast control channel) for a random access sequence and a sub-carrier number assigned to an AGCH (access grant channel) and then transmits the random access sequence in a random access channel. After transmission of a plurality of cycles of the random access sequence the mobile station checks the AGCH to determine whether, or not the base station has granted the mobile station access. Preferably the random access sequence is transmitted at a power determined by data carried on the AGCH channel and, if the mobile station is not granted access to the base station, the mobile station retransmits the random access sequence at higher power.

Once the random access sequence is detected, the base station raises a busy flag in the BCH by removing the random access sequence from the BCH. The base station then transmits timing advance information on the AGCH, which is used by the mobile station to adjust a mobile station's timing advance in accordance with the transmitted data. The mobile station then transmits another random access signal with a new random access sequence to verify the timing advance adjustment made by the mobile station.

Upon receipt of the new random access sequence, the base station transmits an acknowledgment on the AGCH together with data informing the mobile station which sub-carriers will be employed for a DICH (dedicated information channel) and DCCH (dedicated control channel), and the mobile station then transmits a randomly selected number which is echoed by the base station to identify the mobile station, in order to prevent data collisions with other mobile stations.

Variations of the random access sequence include a m-sequence, a Gold sequence, and a four phase sequence with good cross-correlation properties. The random access sequence may be applied to all available sub-carriers.

Alternatively certain sub-carriers, dedicated to the random access channel, to which the random access sequence is applied, may be transmitted at a higher power than other sub-carriers, to which the random access sequence is also applied.

However, the random access sequence may be applied only to certain sub-carriers dedicated to the random access channel. Sub-carriers dedicated to the random access channel may be unequally spaced from each other.

The random access sequence is preferably cyclically repeated without any guard space between symbols, all other channels bearing modulated data, such as, BCH and DICH, preferably include guard spaces between symbols.

The guard spaces preferably have a duration with an integer relationship to the duration of a symbol in the random access channel.

A base station preferably responds to a random access sequence transmitted by a mobile station if, and only if, the random access sequence is detected in at least two consecutive data frames.

According to a second aspect of the present invention, a mobile radio telecommunications system comprising a plurality of base stations, a plurality of mobile stations using OFDM for uplinks between the plurality of mobile stations and base stations, characterized in that the mobile radio telecommunications system is adapted to operate with a random access protocol as set forth in the preceding summary paragraphs.

According to a third aspect of the present invention, there is provided a method of measuring performance of a random access sequence, suitable for use with a random access protocol as set forth above, characterized in that a signal is generated by modulating a random access sequence to be tested onto a plurality of sub-carriers and then subjecting the signal to IFFT (inverse FFT) processing, introducing a time shift into the signal subjecting the signal to a multi-path model process so to simulate delay spread and doppler shift and then passing the signal to a receiver in which the random access sequence is detected and timing advance estimated.

Noise may be injected into the signal, after the signal has been subject to the multi-path model process.

According to a fourth aspect of the present invention, an apparatus measures performance of a random access sequence, suitable for use with a random access protocol as set forth above. The apparatus includes IFFT means for performing inverse fourier transform processing of a signal comprising a random access sequence to be tested, the signal being modulated onto a plurality of sub-carriers. The apparatus also includes time shift means for introducing a random time shift with a uniform distribution over the duration of one symbol, into the signal; modelling means for simulating, on the signal, the effects of delay spread and doppler shift; and receiving means for detecting the random access sequence and estimating timing advance. Noise generating means preferably inject noise into the signal, after the signal has passed through the modelling means.

According to a fifth aspect of the present invention, a mobile radio telecommunications system includes a plurality of base stations and a plurality of mobile stations and use, FD OFDM for uplinks between the mobile stations and the base stations. The system employs a random access protocol in which a mobile station transmits a random access sequence. Furthermore, the system is characterized in that:

the mobile station listens for a PICH transmitted by the base station;

after detection of the PICH, the mobile station synchronizes to OFDM symbols transmitted by the base station, and then transmits the random access sequence in a random access channel;

the mobile station then listens to a BCH for a random access sequence that is free and a sub-carrier number for an AGCH;

after transmission of a plurality of cycles of the random access sequence, the mobile station checks an AGCH to determine whether, or not, the base station has granted the mobile station access to the base station;

the random access sequence is transmitted at a power determined by data carried on the AGCH channel;

if the mobile station is not granted access to the base station, the mobile station retransmits the random access sequence at a higher power;

upon detection of the random access sequence, the base station sets a busy flag in the BCH by removing the random access sequence from the BCH;

the base station transmits timing advance information on the AGCH;

the mobile station adjusts a timing advance in accordance with the transmitted data;

the mobile station transmits another random access with a new random access sequence to verify timing advance adjustment made by the mobile station;

on receipt of the new random access sequence, the base station transmits an acknowledgment on the AGCH together with data informing the mobile station which sub-carriers will be employed for a DICH and DCCH;

the mobile station then transmits a randomly selected number which is echoed by the base station to identify the mobile station in order to prevent data collisions with other mobile stations; and the mobile station cyclically repeats the random access sequence.

According to the present invention, the random access sequence can be repeated cyclically and may comprise an m-sequence, a Gold sequence, or a four phase sequence with good cross-correlation properties, which is modulated onto the sub-carriers in the frequency domain. The random access sequence is transmitted without guard spaces. The random access sequence may be modulated onto all sub-carriers, or alternatively onto selected sub-carriers only. Alternatively, the random access sequence may be modulated onto all sub-carriers, but some sub-carriers may be transmitted at higher power than others.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

A large number of abbreviations are used in the description of embodiments of the present invention. To assist the reader, a glossary of the principle terms and abbreviations employed herein is set out below.

Figure 16:
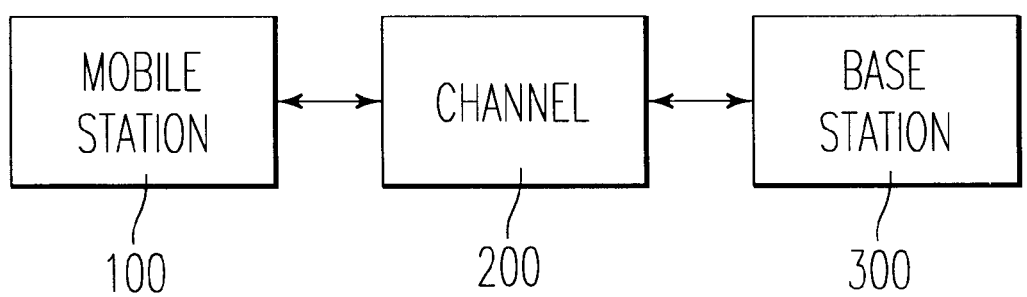
FIG. 16 is a block diagram illustrating an exemplary system architecture for the present invention.

ACA: Adaptive Channel Allocation
AGCH: Access Grant Channel
BCH: Broadcast Control Channel, sometimes abbreviated as BCCH
BS: Base Station
C-time: Correlation time
CD-OFDM: Code Division OFDM
COFDM: Coded OFDM
CODIT: Code Divided Testbed—subject of a Race II project
DCCH: Dedicated Control Channel
DICH: Dedicated Information Channel
FD-OFDM: Frequency Division OFDM
FFT: Fast Fourier Transform
Gold code: Pseudo-random sequence defined by R. Gold in 1967 with low mutual cross-correlation
GSM: A European standard for digital mobile cellular radio telephony.
IFFT: Inverse Fast Fourier Transform
m-sequence: Maximum Length Sequence
MS: Mobile Station
OFDM: Orthogonal Frequency Division Multiplex
PICH: Pilot Channel
PSTN: Public Switched Telephone Network
QAM: Quadrature Amplitude Modulation
QPSK: Quadrature Phase Shift Keying
RA: Random Access
RACH: Random Access Channel
SCH: Synchronization Channel
SNR: Signal to Noise Ratio
TA: Timing Advance
TDMA: Time Division Multiple Access
U/I: User to Interference Ratio A random access protocol, according to the present invention, will now be described, with reference to call set up. A similar procedure may, of course, be used in call handover between base stations. Initially, as shown in FIG. 16, a mobile station 100 listens for the PICH transmitted by the base station 300 through a channel 200. The PICH provides the base station identification and, in combination with the SCH, enables the mobile station to synchronize to OFDM symbols transmitted by the base station. The mobile station must then synchronize with the BCH so that it can obtain information about which random access sequence to use and which sub-carriers will be utilized by the AGCH. The mobile station then transmits the random access sequence and increases the output power in accordance with power control information transmitted by the base station over the AGCH. The mobile station transmits 25 consecutive random access sequences, checks the AGCH to see if random access has been granted, and, if note increases the output power and tries again. The initial output power on the random access channel is based on the received power from the base station, together with some margin. The duration of 25 consecutive random access sequences is 5 ms.

When the base station detects the random access channel, a busy flag is raised on the BCH by removing the random access code from the BCH. The base station, sends timing advance (TA) information on the AGCH. The mobile station then adjusts the time offset in accordance with the TA information and transmits a new random access sequence to verify the adjusted time offset. The base station sends an acknowledgement on the AGCH if the correct TA information was used. The base station informs the mobile station which sub-carriers the mobile station should utilize for the DICH and corresponding DCCH. The mobile station then transmits a randomly selected number, which is echoed by the base station, and is used to identify the mobile station and resolve any possible collision problems.

Three different types of random access channel protocol may be used. All of these, are preferably based on a m-sequence, mapped on the sub-carriers in the frequency domain. Each sub-carrier transfers a four-phase constellation (QPSK). The same m-sequences are used to form the I and Q components of the OFDM signal, (the I component is the in-phase component and the Q component is the quadrature phase component). The good autocorrelation properties of m-sequences make them suitable for use in random access protocols. Other possible sequences are Gold sequences, or four-phase sequences with good cross-correlation properties. In fact, there may be advantages in using the latter two sequences in certain systems.

The three types of random access channel are herein denoted as type 1, type 2 and type 3.

A type 1 random access channel carries the random access sequence on all available sub-carriers. The m-sequence has a length of 511 symbols. This type of random access channel operates at very low SNR so that the random access does not disturb other traffic.

A type 2 random access channel is similar to type 1 random access channel in that the m-sequence is placed on all sub-carriers. However, some of these sub-carriers are dedicated to the random access channel, and these are not available to other users, and use a higher power than the other sub-carriers.

A type 3 random access channel uses only dedicated sub-carriers for the random access sequence. As in type 2 random access channel, dedicated sub-carriers are not available to other users so the SNR will be significantly better. The m-sequence will, however, be much shorter than the 511 symbol m-sequence used in the type 1 random access channel because only a limited number of sub-carriers are allocated to the random access channel.

Figure 1:
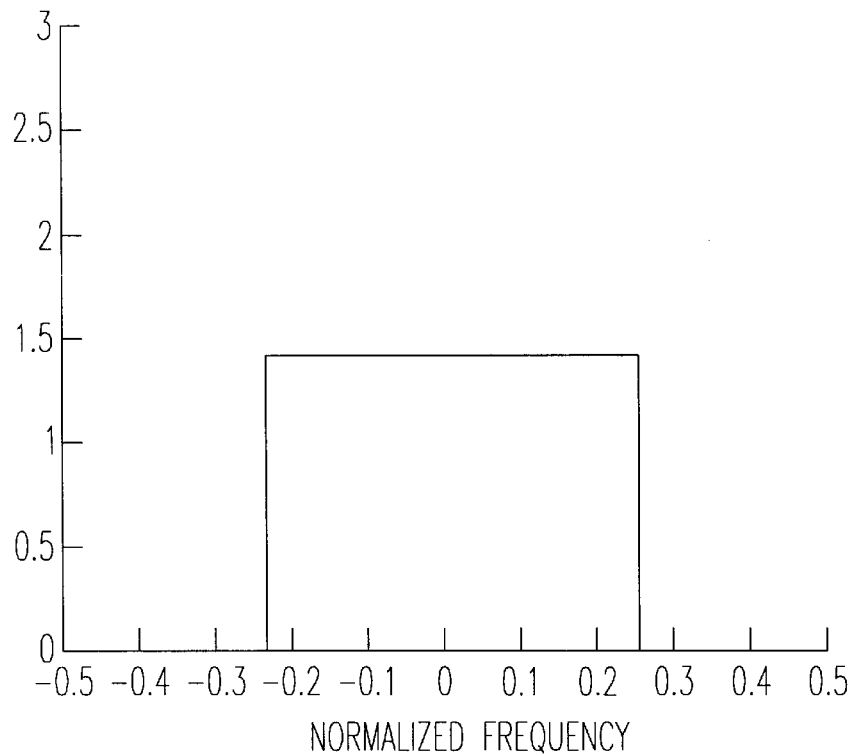
FIG. 1 is a graph illustrating an exemplary power spectrum of a first type of random access channel.
Figure 2:
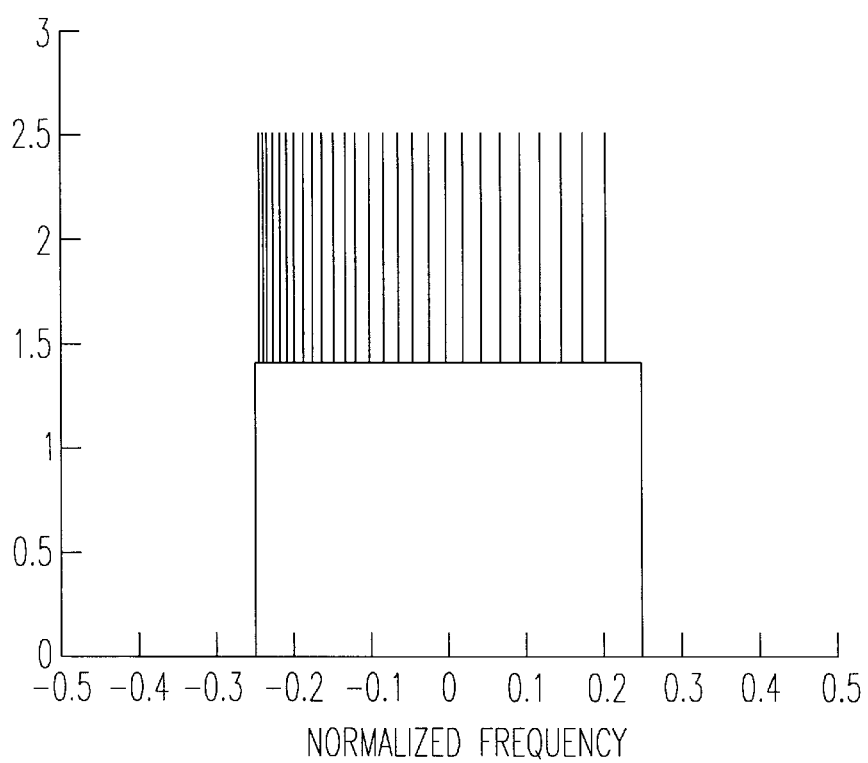
FIG. 2 is a graph illustrating an exemplary power spectrum of a second type of random access channel.

FIGS. 1 and 2 show the respective relative power spectra of type 1 and type 2 random access channels. Spreading of the random access sequence over all sub carriers, in type 1 and type 2 random access channels, facilitates the estimation of the offset time of a known sequence, which is drowned in noise. The type and length of the sequence is a determining factor for the SNR. Because the random access channel will interpret other users' information as noise, and vice versa, the power ratio between users and the random access channel should be as large as possible so that the random access channel does not interfere with normal traffic created by users of the system.

Figure 3:
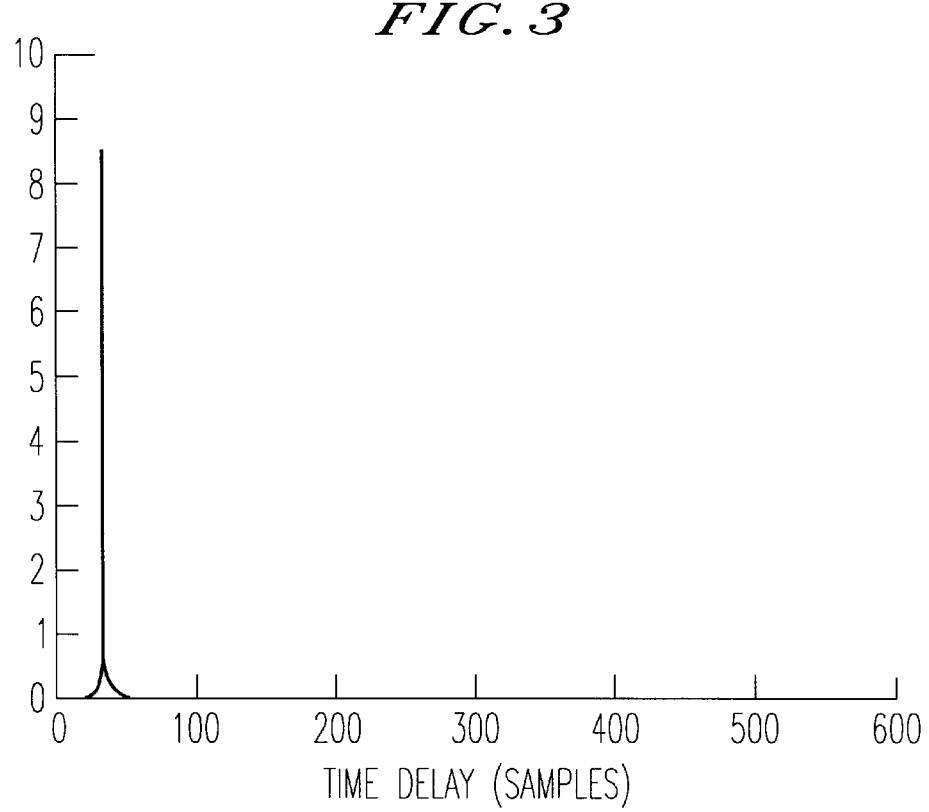
FIG. 3 is a graph illustrating the impulse response of a matched filter for an exemplary m-sequence length of 511.
Figure 4:
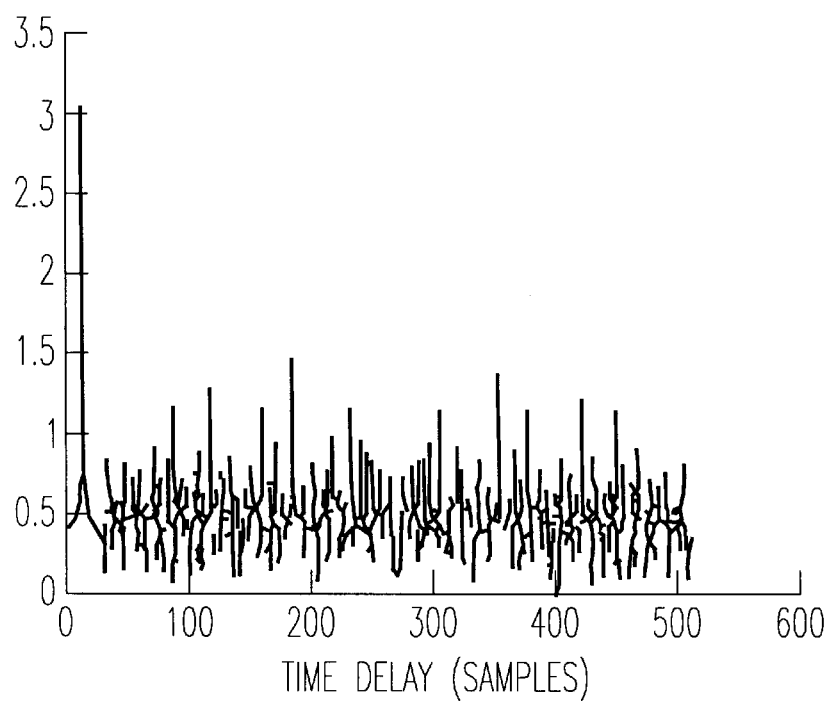
FIG. 4 is a graphic illustrating an exemplary impulse response of a matched filter for an m-sequence of 31 padded with zeros to a length of 511, with dedicated sub-carriers being unequally spaced.
Figure 5:
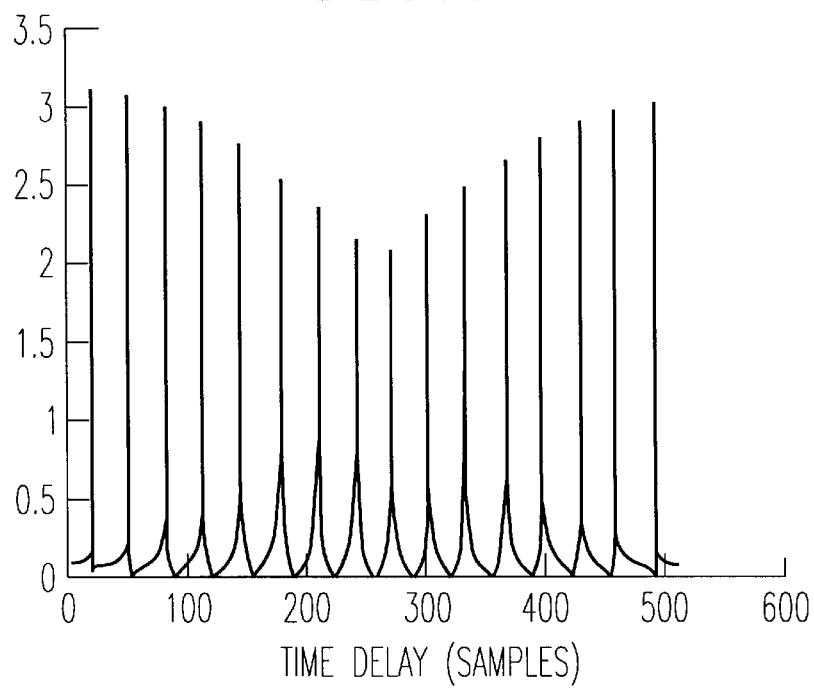
FIG. 5 is a graph illustrating an exemplary impulse response of a matched filter for an m-sequence of 31 padded with zeros to a length of 511, with dedicated sub-carriers being equidistant.

The spacing, between random access channel dedicated sub-carriers (e.g. for type 2 and type 3 channels), is critical to the performance of time offset estimation. The effect of sub-carrier choice for the random access channel, on time offset estimation, is illustrated in FIGS. 3 to 5. FIG. 3 corresponds to a full length, 511, m-sequence, while FIGS. 4 and 5 correspond to a m-sequence of length 31 with zeros padding the length to 511. In FIG. 4, the sub-carrier spacing, between sub-carriers dedicated to the random access channel, varies, while in FIG. 5, the sub-carrier spacing, between sub-carriers dedicated to the random access channel, is the same, i.e. dedicated sub-carriers are evenly distributed throughout the OFDM raster. When the dedicated sub-carriers are equally spaced, an ambiguity occurs with the time offset, as can be seen from FIG. 5. The choice of an appropriate separation between the sub-carriers, dedicated to the random access channel, minimizes this ambiguity, as can be seen from FIG. 4.

Figure 6:
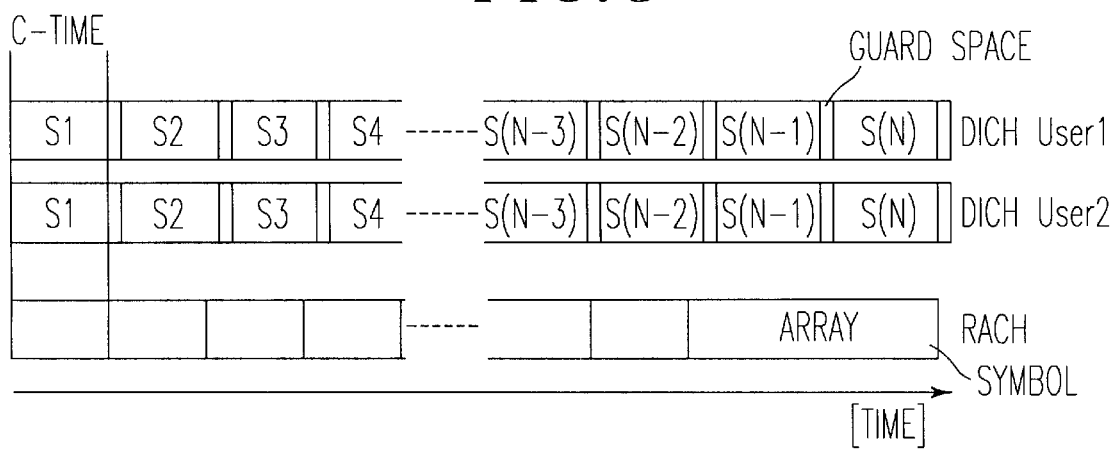
FIG. 6 is a timing diagram illustrating the relationship between the information channel, DICH, and the random access channel, RACH.

Before the random access sequence is subjected to IFFT in the transmitter, zeros are padded into the sequence to generate a 1024 point array. This band limits the random access channel, see FIGS. 1 and 2. The random access sequence is repeated cyclically without any guard space. All other channels, e.g. BCH and DICH, that carry modulated information, include a guard space between symbols, see FIG. 6. An advantageous property of the cyclically repeated, band limited, random access sequence is that orthogonality is maintained and it is, therefore, easy to estimate the time offset required by the delay difference. The relationship between the duration of the random access channel and the duration of the guard time is preferably an integer, N, so that the random access channel will be synchronized to all other channels each Nth OFDM symbol, see FIG. 6, i.e. an integer relationship exists between the duration of a guard space and the duration of an OFDM symbol in the random access channel.

Two important parameters for judging the performance of a random access protocol are the probabilities for the occurrence of a false detection of a random access sequence and failure to detect a correct random access sequence. A random access sequence is detected when a base station correctly identifies that a mobile station has transmitted a random access sequence. A mobile station also has to measure the propagation delay in a received random access sequence herein called estimation.

Detection and estimation are performed in two separate arms of a base station receiver, as will be described later with respect to FIG. 7.

A false alarm is defined as the detection of a random access sequence when no such sequence has been transmitted by a mobile station in the cell served by the base station. False alarms may be caused by (1) detection of a random access sequence transmitted by a mobile station in a neighboring cell or by (2) background noise being incorrectly interpreted as a random access sequence.

The first case above is considered to be unlikely, and the probability can be further reduced by requiring two random access attempts using different random access sequences.

In the second case, the probability of a false alarm, is the probability that white Gaussian noise introduced by the communications channel be improperly interpreted as a random access sequence. Based on the arrangement described with reference to FIG. 7, the energy signal from every signal generator 21 entering the detector 23 can be written as:

$$E = \sum_{i=1}^{n} |X_{R,i} + j \cdot X_{I,i}|^2$$
$$= \sum_{i=1}^{n} X_{R,i}^2 + \sum_{i=1}^{n} X_{I,i}^2$$
$$= \sum_{i=1}^{2n} X_i^2$$

where $X_{R,i}$, $X_{I,i} \in N(O,\sigma)$, and are the real and imaginary parts of the noise in sub-carrier i, n is the number of sub-carriers dedicated to the random access channel, $N(O,\sigma)$ is white Gaussian noise with a zero mean and standard deviation $\sigma$. The last step of the above calculation performed is on the assumption that all noise is uncorrelated, $X_i \in N(O,\sigma)$. It can be shown that $E \in \chi^2$ with m=2n degrees of freedom, i.e. E has a Chi square distribution, see J. G. Proakis "Digital Communications" McGraw-Hill 2nd ed., 1989, which gives $$E\{E\} = m \cdot \sigma^2 = 2 \cdot n \cdot \sigma^2$$

and in the case when m is even,
where $F_E(y)$ is the probability of value y and $F_E$, is the probability density function of E, $$F_E(y) = 1 - e^{\frac{y}{2 \cdot \sigma^2}} \cdot \sum_{k=0}^{n-1} \frac{1}{k!} \cdot \left(\frac{y}{2 \cdot \sigma^2}\right)^k$$

The probability of a false alarm, PFAl can now be calculated as $$P_{FA} = P(E > KE\{E\}) = 1 - P(E \geq K2n\sigma^2)$$

$$= 1 - F_E(K2n\sigma 2)$$

$$= e^{-Kn} \sum_{k=0}^{n-1} \frac{1}{k!} (Kn)^k$$

where K is the number of times the signal has to rise above the normal noise energy floor and k is the summation variable.

The probability of a false alarm for different values of K and n is set out in the following table:

|       | n = 3 | n = 5 | n = 10 | n = 15 | n = 31 |
|-------|-------|-------|--------|--------|--------|
| K = 2 | $9.15 \times 10^{-2}$ | $2.2 \times 10^{-2}$ | $4.99 \times 10^{-3}$ | $9.21 \times 10^{-4}$ | $4.99 \times 10^{-6}$ |
| K = 3 | $1.73 \times 10^{-2}$ | $8.57 \times 10^{-4}$ | $7.12 \times 10^{-6}$ | $6.57 \times 10^{-8}$ | $2.55 \times 10^{-14}$ |

The use of K=2 and 31 dedicated sub-carriers gives a false alarm probability of $4.99 \times 10^{-6}$ which corresponds to one false alarm every 40 seconds (GSM allows a false alarm every 23 seconds). This probability could be drastically reduced if g successive frames must fulfill the detection criteria. If these events can be considered as independent, the false alarm rate is $$P_{FA,g} = P_{FA}{}^g$$

The use of K=2 and g=2 would give a false alarm rate of $2.49 \times 10^{-11}$ which corresponds to one false alarm every 13th week.

The probability of a correct random access is defined as the probability of detecting the random access and estimating the timing advance information. This probability is difficult to compute, so it is preferably evaluated using a simulation. Suppose that:

A is the event of a correct detection; and
B is the event of correct timing advance estimation.
The probability of one correct random access attempt can be expressed as $$P_1(A \cap B) = P(A)P(B|A)$$

where the probabilities P(A) and P(B|A) are easy to measure in a simulation.

The signalling protocol preferably demands two successive random access attempts. These two attempts may be assumed to be independent, even though the small time difference between the attempts implies that they are not actually independent. However, if the first random access attempt succeeds it is likely that the next one will also succeed, because there will only be small changes in the communication channel. Thus, a worst case could then be considered as two independent attempts, which can be written as $$P_{RA} = P_1(A \cap B)P_2(A \cap B) = (P(A \cap B))^2$$

A special problem occurs when the base station detects the random access but can't perform a correct timing advance estimation. In code divided tested (CODIT) this is treated as a false alarm but this cannot be done in the OFDM case because an error in timing advance information will lead to lost orthogonality in the mobile station and will (interfere with) jam other users. The solution resides in the signalling protocol, (the random access protocol), previously described, which requires an additional random access to be transmitted to check the timing advance estimation, and this repeated transmission will not break the orthogonality. The probability of jamming can then be calculated as the probability of two (independent) successive random access attempts where detection is successful but estimation fails. All other cases do not lead to a loss of orthogonality, because no transmission is permitted from the mobile station. Using the same variables as before, this probability can be written as $$P_j = P(A_1 \cdot \bar{B}_1))P(A_2 \cap \bar{B}_2)P_{equal}$$

where $\bar{B}_x$ is the complementary event in random access number x and $P_{equal}$ is the probability of two successive estimations differing by no more than half a guard space in each direction, a reasonable tolerance. The value of $P_{equal}$ is difficult to calculate, or estimate. If it is assumed that there is uniform distribution of the estimations and that the guard space is approximately 10% of the OFDM frame, then $P_{equal} = 0.10$, the last equation can then be rewritten as $$P_j = (P(A) - P(A \cap B))^2 P_{equal}$$

where $P(A \cap B)$ is the probability of one correct random access attempt.

Figure 7:
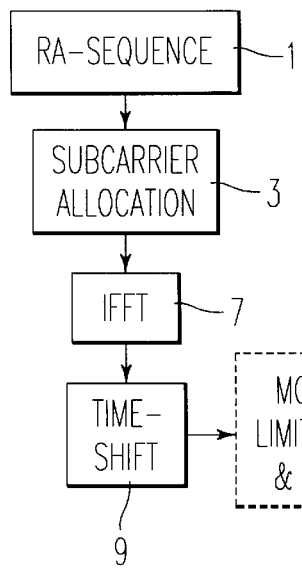
FIG. 7 is a block diagram illustrating an arrangement for environmental simulation of an OFDM system.
Figure 7:
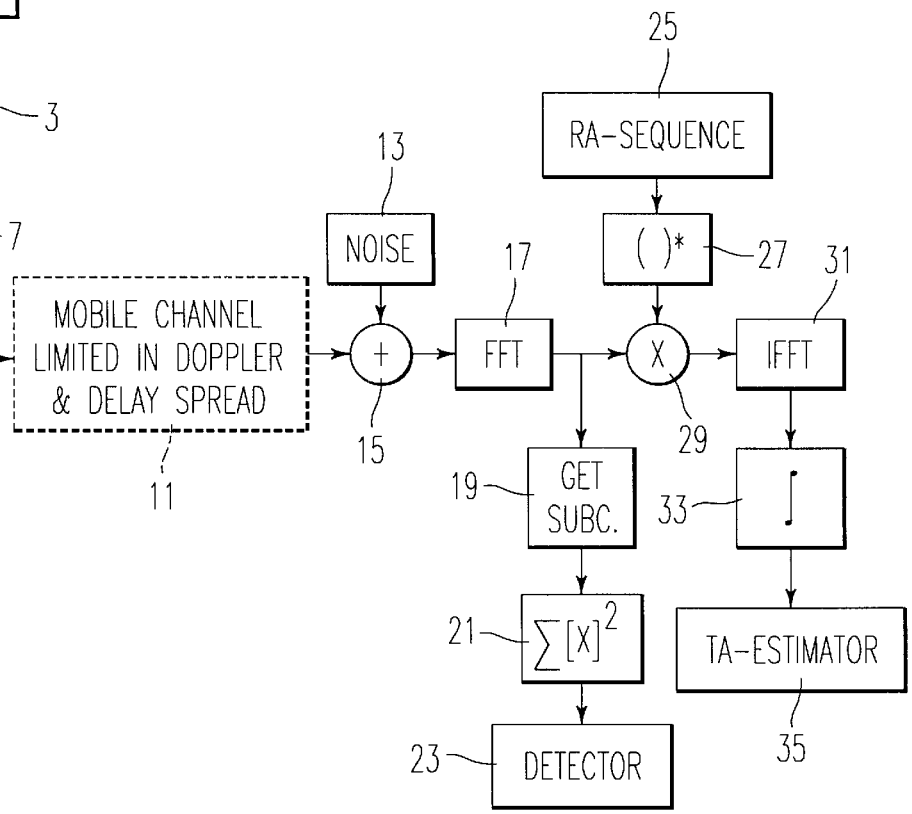

The performance of different random access protocols can be measured using the apparatus illustrated in FIG. 7. This apparatus simulates a fast fading mobile radio channel, which corresponds to a macro cell environment. The delay spread is approximately 10% of the C-time (correlation time) and maximum doppler spread is chosen to be about 2% of the sub-carrier bandwidth. The random access sequence is allocated to sub-carriers by circuit 3, in accordance with the random access protocol under test, to form a signal which is subjected to IFFT circuit 7. A time shift is then introduced into the signal by circuit 9 to simulate the propagation delay between the mobile station and base station. A random time shift with a uniform distribution over the duration of one OFDM symbol is used during each random access attempt. Delay spread and doppler shift are simulated using a 100-tap multi-path model 11 corresponding to a Jakes model, see W. C. Jakes et al., "Microwave Mobile Communications", John Wiley & Sons, New York 1974. Finally noise is added to the signal.

Figure 8:
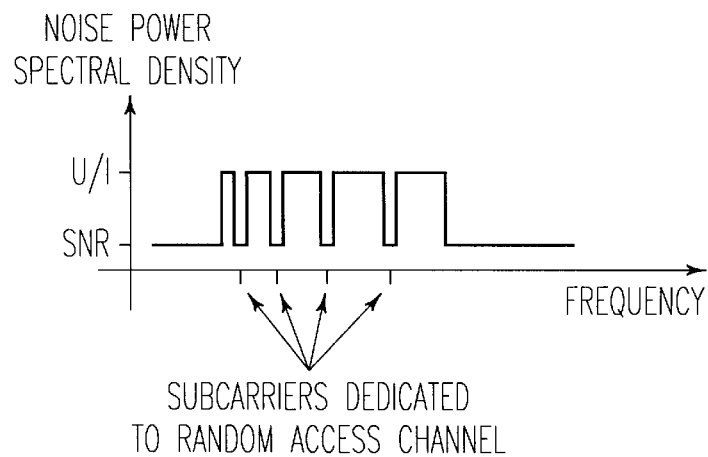
FIG. 8 is a graph illustrating an exemplary noise spectral density for punctuated noise.

The noise source 13 provides punctuated noise, which includes two complex components defined by two parameters, U/I and SNR. The spectral density of punctuated noise is illustrated in FIG. 8. It should be noted that the parameters SNR and U/I are not the power spectral density, but parameters used to calculate the spectral density. It will be observed that there is a background noise level defined by SNR and a noise level representative of noise generated by other users of the system defined by U/I. The punctuation feature of the noise spectrum appears only when a subset of the available carriers are dedicated to the random access channel, as is the case with type 2 and type 3 random access channels. Other users will not use dedicated sub-carriers, so that the only noise appearing on these sub-carriers will be background noise. If it is assumed that there are a large number of users on the system, U/I noise can be approximated by complex Gaussian noise. During simulations, a normal traffic load is used and other users are assumed to occupy 37% of the sub-carriers, selected at random.

The receiver, illustrated in FIG. 7, has two arms, one for time estimation and the other, for random access detection.

The timing advance estimator uses a matched filter implemented in the frequency domain. To reduce the noise interference, an integrator 33 is used to integrate over a number of random access frames. Typically, the integration may be performed over 24 OFDM symbols. This corresponds to a time period of between 2.5 ms and 5 ms, with a C-time duration between 100 ps and 200 ps, which represents a reasonable integration time in a mobile channel, see R. Braun & U. Dersh, "A Physical Mobile Radio Channel Model" IEEE Transactions Vehicular Technology, Vol 40, No 2, May 1991, pp 472–482.

The detection arm of the receiver picks out the sub-carriers using circuit 19 dedicated to the random access channel and calculates total energy with calculator 21. The random access channel will be detected with detector 23 if the energy rises above the normal energy floor on K occasions. The next 25 energy values are saved, since the random access will end some where in this window. The last frame that meets the detection criteria is used for timing advance estimation. This procedure ensures that timing estimation is performed on a frame at the end of the random access procedure, when noise has been decreased by integration.

In assessing the performance of different random access protocols, key parameters are probability of detection, timing advance estimation and false alarm ratio.

The connection between dedicated sub-carrier distribution and performance is by no means simple. For type 2 and 3 random access channels, several simulations are preferably performed in order to determine a good pattern for the dedicated sub-carriers. To compare the different patterns, a score system is preferably used in which the score is defined as the highest peak in the impulse response divided by the second highest peak. The total energy in the random access channels must be maintained at the same level so that scores between different random access channels can be legitimately compared.

Figure 11:
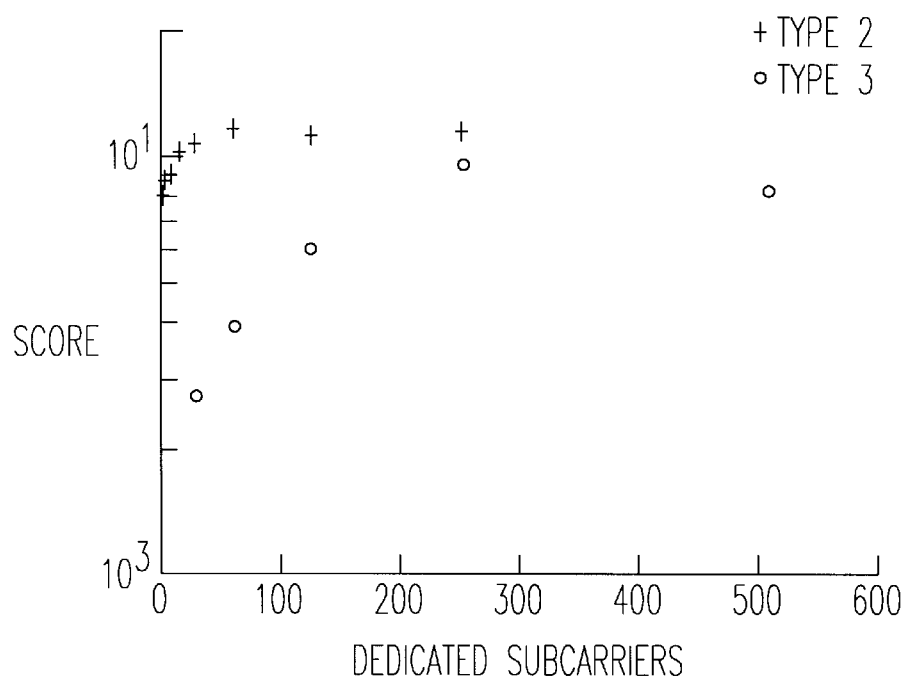
FIG. 11 is a graph illustrating the influence of channel frequency response on an exemplary random access channel.

FIG. 11 illustrates the effect of the number of sub carriers on the score. It will be seen that random access channel type 2 ("f") always out performs random access channel type 3 ("o"), because of the longer m-sequence employed in type 2 random access channel. For large numbers of dedicated, (to the random access channel), sub-carriers, there is little difference between the performance of type 2 and type 3 random access channels. Of course, when 511 dedicated sub-carriers are used, both type 2 and type 3 random access channels converge into type 1 random access channel.

Figure 10:
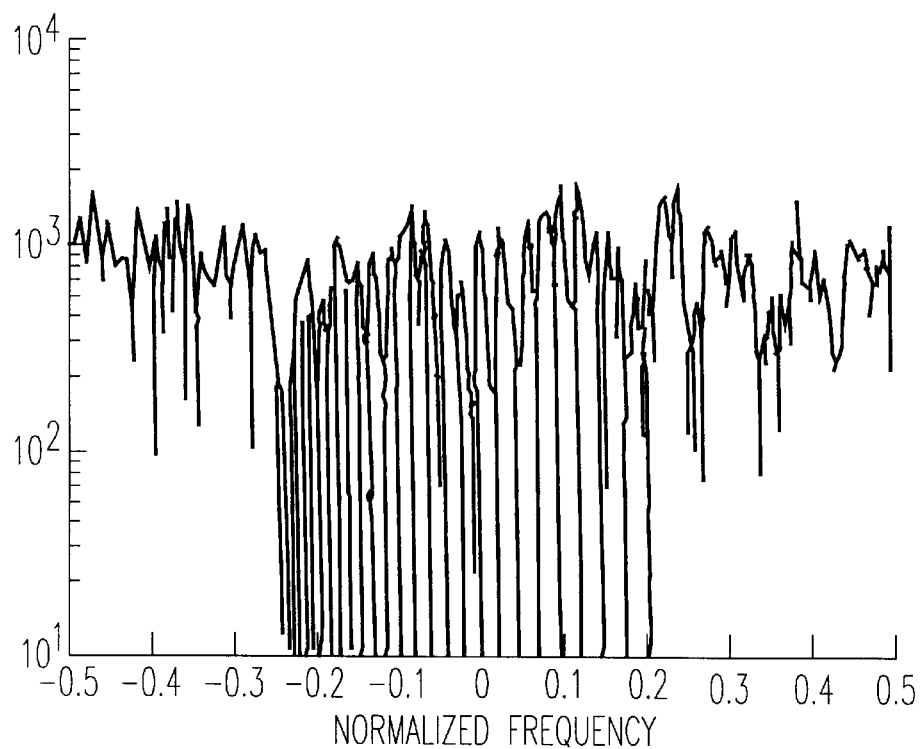
FIG. 10 is a graph illustrating an exemplary affect of random access channel type on a performance score.

Another problem that is encountered with selection of a pattern of dedicated sub-carriers for type 2 and type 3 random access channels appears if a lot of information is concentrated into a narrow frequency band. If there is a dip in the channel frequency response in such a band, it will lead to a very substantial loss of information in the random access channel which will in turn make detection and estimation impossible. This problem only occurs in connection with a type 3 random access channel, and is illustrated in FIG. 10. It is thus, important with a type 3 random access channel, to select a pattern of sub-carriers spread across the available OFDM frequency raster.

When only a limited number of sub-carriers are selected, a type 2 random access channel performs significantly better than a type 3 random access channel. There is little difference between the performance of type 1 and type 2 random access channels. The injection of power in a type 2 random access channel increases detection probability, the base station only has to check the output of the matched filter when there is a significant increase in power on the dedicated sub-carriers.

Figure 9:
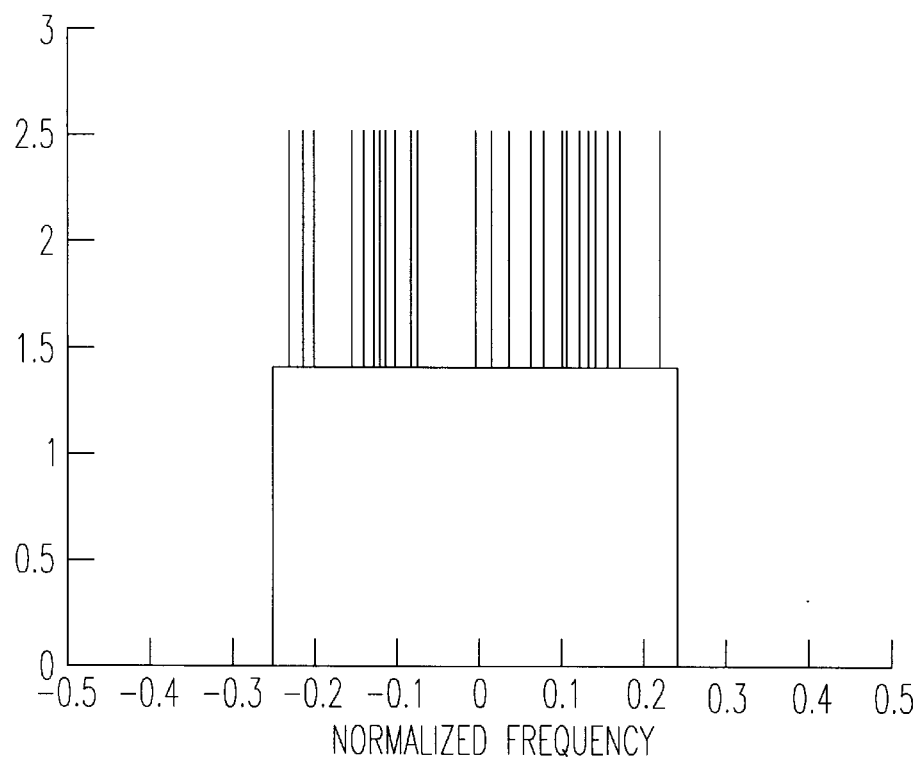
FIG. 9 is a graph illustrating an exemplary random access channel used for simulation.

There is no simple solution to the choice of the number of sub-carriers dedicated to the random access channel. It could be advantageous, see the description relating to false alarm probability, to use very few sub-carriers dedicated to the random access channel, in combination with some successive frames, demand. This will, however, make the timing advance estimation less accurate, because of ambiguity as to which frame to use in the estimate. On the other hand, a large number of dedicated sub-carriers occupies a lot of capacity both in terms of bandwidth and signalling information. The use of 31 sub-carriers is an acceptable compromise, when arranged in the sub-carrier pattern illustrated in FIG. 9.

Simulations, using the apparatus illustrated in FIG. 7, have confirmed theoretical calculations of false alarm probabilities.

Figure 12:
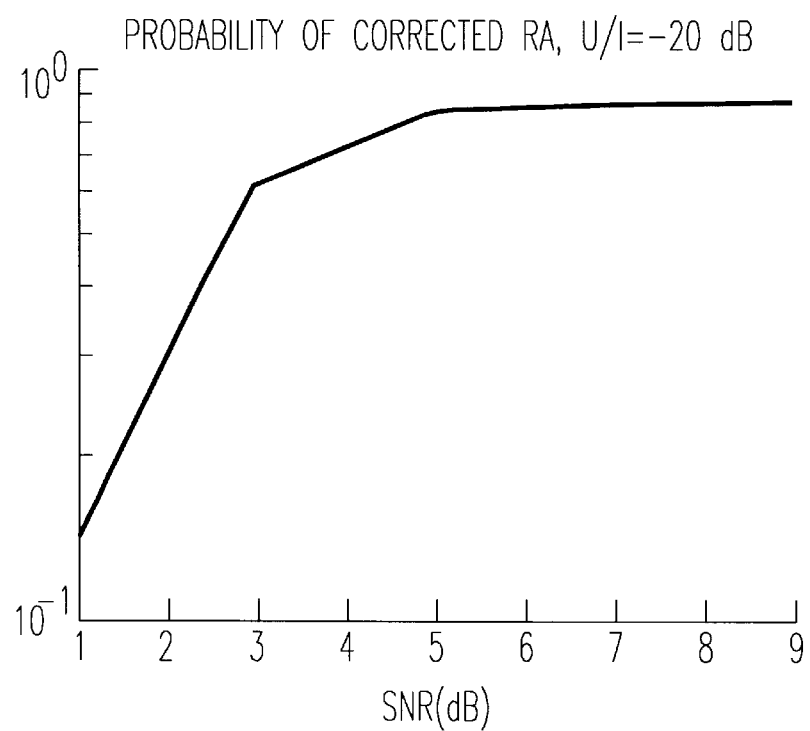
FIG. 12 is a graph illustrating a first exemplary performance of the random access protocol according to a first scenario.
Figure 13:
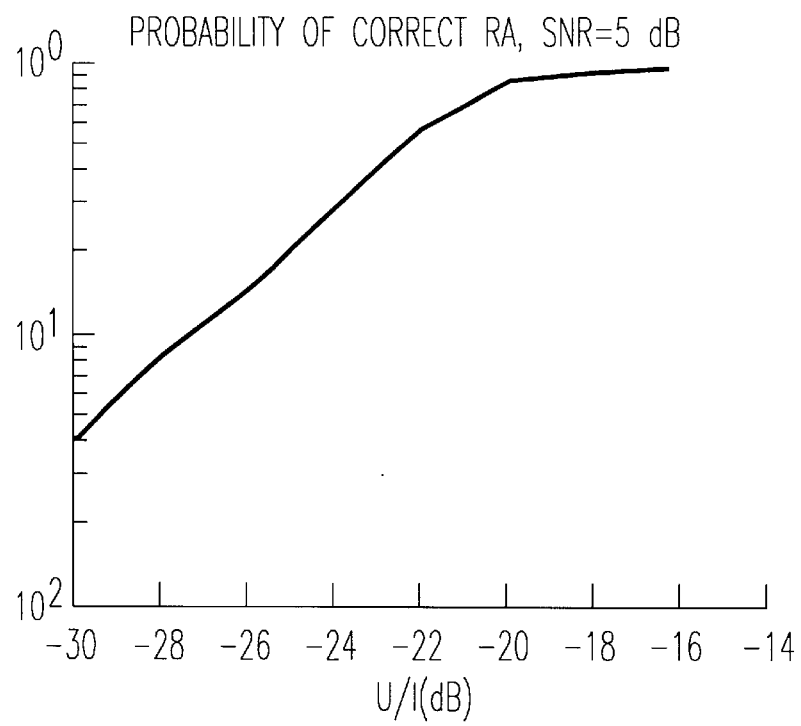
FIG. 13 is a graph illustrating a second performance of the random access protocol according to a second scenario.

Performance of the random access protocol of the present invention is illustrated in FIGS. 12 and 13. FIG. 13 shows that the random access protocol can operate at very low U/I. The low probabilities of U/I depends on problems in the timing estimation. The detection probability never falls below 99.3% in the simulation. FIG. 12 shows that performance is very dependent on SNR. The simulation shows that drop at low SNR depends mainly on the detection process which is independent of U/I.

Figure 14:
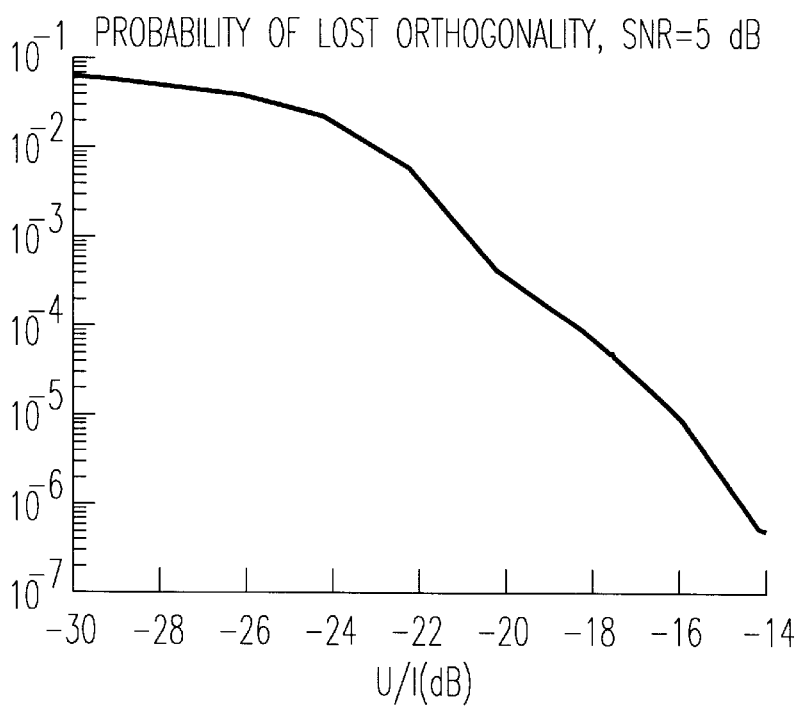
FIG. 14 is a graph illustrating a first exemplary probability of a mobile station breaking orthogonality, using a random access protocol.
Figure 15:
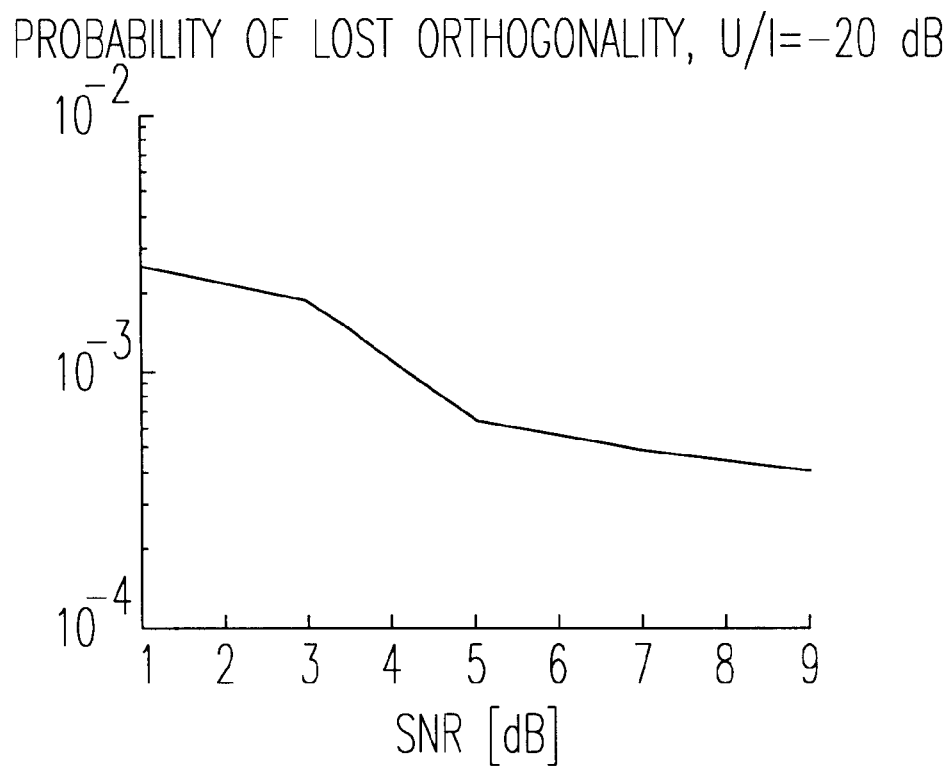
FIG. 15 is a graph illustrating a second exemplary probability of a mobile station breaking orthogonality, using a random access protocol.

The probability of jamming occurring as a result of breaking orthogonality, is illustrated in FIGS. 14 and 15.

Simulations performed on type 1, type 2 and type 3 random access channels show that a type 2 random access channel represents a particularly advantageous protocol, enabling easy detection and estimation of time delay between a mobile station and a base station without disturbing orthogonality.

The performance of a type 3 random access channel can be improved by using an equalizer that is implemented in the frequency domain.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A random access protocol method for communicating between a mobile station and a base station in a multi-access digital radio communications system comprising the steps of:

cyclically repeating a random access sequence; and transmitting each cyclically repeated random access sequence in an orthogonal frequency division multiplex format from the mobile station as an uplink transmission to the base station, which receives and combines the random access sequence that is cyclically repeated in said cyclically repeating step so as to improve a probability of detecting an access request by said mobile station.

2. The random access protocol method as claimed in claim 1, wherein said transmitting step comprises transmitting said random access sequence in the frequency division orthogonal frequency division multiplex format.

3. The random access protocol method as claimed in claim 2, further comprising the steps of:
   transmitting a pilot channel from said base station;
   detecting said pilot channel at said mobile station;
   synchronizing at said mobile station to an orthogonal frequency division multiplex symbol of said orthogonal frequency division multiplex format transmitted by said base station;
   listening at said mobile station to a broadcast control channel for said random access sequence and a sub-carrier number which corresponds to an access grant channel;
   transmitting at said mobile station said random access sequence in the random access channel for a plurality of cycles; and
   checking said access grant channel by said mobile station to determine whether said base station has granted said mobile station access.

4. The random access protocol method as claimed in claim 3, wherein said transmitting step comprises:
   transmitting said random access sequence at a power determined by data carried on the access grant channel AGCH channel, and if said mobile station is not granted access to said base station as checked in said checking step, said mobile station retransmits said random access sequence at a higher power.

5. The random access protocol method as claimed in claim 3, further comprising the steps of:
   detecting said random access sequence at said base station;
   raising a busy flag in said broadcast control channel at said base station in response to detecting said random access sequence in said detecting step, said raising step comprising,
      removing said random access sequence from said broadcast control channel;
   transmitting at said base station timing advance information on said access grant channel by said base station;
   adjusting at said mobile station a mobile station timing advance in accordance with said timing advance information; and
   transmitting at said mobile station a second random access sequence to verify the mobile station timing advance adjustment made by said mobile station in said adjusting step.

6. The random access protocol method as claimed in claim 5, further comprising the steps of:
   transmitting at said base station an acknowledgement upon receipt of said second random access sequence, said acknowledgment comprising data informing said mobile station which of plural sub-carriers will be employed for a dedicated information channel and a dedicated control channel, said acknowledgment transmitted on said access grant channel;
   receiving said acknowledgement at said mobile station;
   transmitting at said mobile station a randomly selected number; and
   echoing the randomly selected number at the base station which was transmitted by said mobile station at said transmitting step, said echoing step for identifying the mobile station in order to prevent data collisions with other mobile stations.

7. The random access protocol method as claimed in claim 1, wherein said transmitting step comprises transmitting a m-sequence as said random access sequence.

8. The random access protocol method as claimed in claim 1, wherein said transmitting step comprises transmitting as said random access sequence a Gold sequence.

9. The random access protocol method as claimed in claim 1, wherein said transmitting step comprises transmitting as said random access sequence a first four phase sequence which is capable of being cross-correlated with a second four phase sequence.

10. The random access protocol method as claimed in claim 1, wherein said transmitting step comprises applying said random access sequence to all of a set of sub-carriers.

11. The random access protocol method as claimed in claim 10, wherein said transmitting step comprises transmitting at a higher power a first subset of said set of sub-carriers dedicated to a random access channel than transmitting of the other sub-carriers to which said random access sequence is also applied.

12. The random access protocol method as claimed in claim 1, wherein said transmitting step comprises the steps of:
   applying said random access sequence only to a subset of a set of sub-carriers, said subset of said set of sub-carriers dedicated to a random access channel; and
   transmitting only said subset of said set of said set of sub-carriers.

13. The random access protocol method as claimed in claim 12, wherein said transmitting step comprises applying said random access sequence to said subset of said set of sub-carriers, said subset of said set of sub-carriers being unequally spaced from each other.

14. The random access protocol method as claimed in claim 1, wherein said cyclically repeating step comprises cyclically repeating said random access sequence without any guard space between each repeated cycle of said random access sequence.

15. The random access protocol method as claimed in claim 14, wherein said transmitting step comprises transmitting said random access sequence in a random access channel and transmitting in another channel modulated data as at least one channel symbol having guard spaces, wherein said guard spaces have respective durations which are in an integer relationship to a duration of a symbol of said random access sequence.

16. The random access protocol method as claimed in claim 1, further comprising the steps of:
   detecting if said random access sequence is properly received at said base station in an at least two consecutive data frames; and
   responding at a base station to said mobile station only if said random access sequence is detected in at least two consecutive data frames in said detecting step.

17. The random access protocol method as claimed in claim 1, wherein said transmitting step comprises transmitting said cyclically repeated random access sequence as a first random access sequence from a first mobile station and transmitting a cyclically repeated second random access sequence from a second mobile station, wherein said first random access sequence and said second random access sequence are transmitted to at least one base station.

18. A method of measuring performance of a random access sequence transmitted in a mobile radio communication system comprising the steps of:

generating a signal comprising a random access sequence, said generating step comprising,
  modulating said random access sequence onto a plurality of sub-carriers to form said signal;
  processing said signal via an inverse fast Fourier transform; and
  introducing a time shift into said signal;
subjecting said signal to a multi-path effect said subjecting step comprising the steps of,
  processing said signal to create a delay spread, and
  processing said signal to create a doppler shift;
passing said signal to a receiver;
detecting at said receiver said random access sequence in said signal; and
estimating a timing advance based on said signal in said receiver, said timing advance indicative of said performance.

19. The method as claimed in claim 18, wherein said subjecting step further comprises injecting a noise into said signal.

20. The method as claimed in claim 19, wherein said injecting step comprises injecting punctuated noise.

21. An apparatus for measuring performance of a cyclically repeated random access sequence in an uplink transmission from a mobile station comprising:
  inverse Fast Fourier Transform means for inverse Fast Fourier transform processing a signal comprising the random access sequence to be tested, said signal modulated onto a plurality of sub-carriers;
  time shift means for introducing into the signal a random time shift which is uniformly distributed over a duration of one symbol;
  simulating means for simulating an effect of delay spread and an effect of doppler shift on said signal;
  receiving means for detecting said random access sequence in said signal; and
  estimating means for estimating the timing shift.

22. The apparatus as claimed in claim 21, further comprising noise generating means for injecting noise into said signal.

23. The apparatus as claimed in claim 22, wherein said noise generating means is adapted to generate punctuated noise.

24. A mobile radio telecommunications system comprising:
  a plurality of base stations;
  a plurality of mobile stations which use a frequency division orthogonal frequency division multiplex format for uplink communications with said plurality of base stations, and employing a random access protocol comprising transmitting a random access sequence, wherein
    said mobile station and a base station of said plurality of based stations establish a communication link by said mobile station listening for a pilot channel transmitted by said base station,
    after detection of said pilot channel, said mobile station synchronizes to an orthogonal frequency division multiplex symbol transmitted by said base station, said mobile station then transmits said random access sequence in a random access channel,
    said mobile station listens to a broadcast control channel for a random access sequence that is not occupied by another of said plurality of mobile stations and for a sub-carrier number corresponding to an access grant channel,
    after transmission of a plurality of cycles of said random access sequence, said mobile station checks said access grant channel to determine whether, or not, said base station has granted said mobile station access,
    said random access sequence is transmitted by said mobile station at a power determined by a set of data carried on the access grant channel AGCH channel,
    if said mobile station is not granted access to said base station, said mobile station retransmits said random access sequence at a higher power,
    on detection of said random access sequence, said base station raises a busy flag in said broadcast control channel by removing said random access sequence from said broadcast control channel,
    said base station transmits timing advance information on the access grant channel,
    said mobile station adjusts a mobile station timing advance in accordance with said timing advance information,
    said mobile station transmits a second random access sequence to verify the timing advance adjustment made by said mobile station,
    on receipt of said second random access sequence, said base station transmits an acknowledgment on said access grant channel together with a second data informing said mobile station which of a set of sub-carriers will be employed for a dedicated information channel and a dedicated control channel,
    said mobile station then transmits a randomly selected number, and
    the base station echoes said randomly selected number so to identify the mobile station in order to prevent data collisions with the other of said plurality of mobile stations and
  said mobile station cyclically repeats said random access sequence.

25. The mobile radio telecommunications system as claimed in claim 24, wherein said random access sequence comprises an m-sequence.

26. The mobile radio telecommunications system as claimed in claim 24, wherein said random access sequence comprises a Gold sequence.

27. The mobile radio telecommunications system as claimed in claim 24, wherein said random access sequence comprises a four phase sequence capable of being crosscorrelated with a second four phase sequence.

28. The mobile radio telecommunications system as claimed in claim 24, wherein said mobile station comprises means for applying said random access sequence to all available of said sub-carriers.

29. The mobile radio telecommunications system as claimed in claim 28, wherein said means for applying applies said random access sequence to a subset of said sub-carriers dedicated to a random access channel, and said means, for applying further comprises power control means adapted to cause said subset of said sub-carriers to be transmitted at a higher power than other sub-carriers, to which said random access sequence is also applied.

30. The mobile radio telecommunications system as claimed in claim 24, wherein said mobile station further comprises means for applying said random access sequence to only certain of said sub-carriers, which are dedicated to a random access channel.

* * * * *